US005806146A

United States Patent [19]

Chen

[11] Patent Number: 5,806,146

[45] Date of Patent: Sep. 15, 1998

[54] MICROPHONE CLIP CONNECTING STRUCTURE

[75] Inventor: Kuo-Chung Chen, Taipei Hsien, Taiwan

[73] Assignee: Jing Deng Industrial Co., Ltd., Taipei Hsien, Taiwan

[21] Appl. No.: 878,158

[22] Filed: Jun. 18, 1997

[30] Foreign Application Priority Data

Oct. 11, 1996 [TW] Taiwan ................................ 85215644

[51] Int. Cl.[6] ................................ A45F 5/02; H04M 1/06

[52] U.S. Cl. .......................... 24/3.11; 381/169; 381/188; 24/3.12; 24/3.1

[58] Field of Search .................................... 24/3.11, 3.12, 24/3.5; 248/683, 689, 231.51, 231.61, 313, 316.1, 316.5, 316.6, 316.7; 381/169, 188

[56] References Cited

U.S. PATENT DOCUMENTS

| | | | |
|---|---|---|---|
| 2,280,304 | 4/1942 | Schauer | 24/3.11 |
| 4,100,653 | 7/1978 | Sensabaugh | 24/3.11 |
| 4,145,583 | 3/1979 | Oshgan et al. | 248/682 |
| 5,274,855 | 1/1994 | Hellweg | 24/3.12 |
| 5,452,497 | 9/1995 | Peng | 24/3.11 |
| 5,664,292 | 9/1997 | Chen | 24/3.11 |

*Primary Examiner*—Randolph A. Reese
*Assistant Examiner*—Robert J. Sandy
*Attorney, Agent, or Firm*—Pro-Techtor International Services

[57] ABSTRACT

Disclosed is a microphone clip connecting structure mainly including a microphone back cover having a round recess, a rotational disk rotatably received in the round recess, and a clip assembled to the rotational disk. A plurality of locating holes and a sunken hole deeper than the locating holes are spaced around the round recess. The rotational disk has a retaining hook and a retaining block at each side of its top surface, defining a mortise space between them. A locating projection extends from a bottom of the retaining block into one of the locating holes or the sunken hole. When the rotational disk is turned with the locating projections extend into two of the locating holes, the rotational disk is temporarily fixed in place. And, when one of the locating projections extends into the sunken hole, its corresponding retaining block on the rotational disk can be easily depressed to allow a tenon on the clip to pass over the retaining block and into the mortise space between the retaining block and the retaining hook, so that the clip can be easily assembled to the rotational disk and accordingly the microphone back cover.

1 Claim, 5 Drawing Sheets

MICROPHONE CLIP CONNECTING STRUCTURE

BACKGROUND OF THE INVENTION

The present invention relates to an improved microphone clip connecting structure in which a microphone back cover is formed with a round recess around which a sunken hole and a plurality of locating holes are provided. The sunken hole is deeper than other locating holes and therefore provides a larger space for a retaining block on a rotational disk received in the round recess to be depressed further and thereby allows a clip to easily assemble to the rotational disk.

FIGS. 5 and 6 illustrate a conventional microphone clip connecting structure. The connecting structure is usually used on a hand-held microphone for communication (such as calling on radio by driver in a car, etc.), so that a user may conveniently clip the microphone onto a pocket or some suitable place when the microphone is not in use.

As shown, the microphone includes a back cover 6 on which a rotational disk 7 is freely rotatably mounted. A clip 3 is connected to the rotational disk 7 to facilitate the safe clipping of the microphone onto something. The back cover 6 has a round recess 61 for receiving the rotational disk 7 therein. A central hole 64 with an internally threaded rod 62 is provided in the round recess 61. A plurality of locating holes 63 are provided around the central hole 64.

The rotational disk 7 also has a central hole 71 in alignment with the central hole 64. A spring 8 and a washer 10 are disposed around the rod 62, and a screw 9 extends from the central hole 71 through the washer 10 and the spring 8 and into the threaded rod 62, so that the rotational disk 7 is slightly vertically movably connected to the back cover 6 and is rotatable in the round recess 61 about the rod 62 relative to the back cover 6. The rotational disk 7 has two sets of upward projected retaining hooks 72 and retaining blocks 73 which together defining a mortise space 74 between them. The retaining block 73 each has a downward extended locating projection 76 for extending into one of the locating holes 63 around the round recess 61. A leaf spring 4 is mounted on a top projection 75 on the rotational disk 7 to elastically support the clip 3. When the locating projections 76 below the retaining blocks 73 engage into two of the locating holes 63 on the round recess 61, the rotational disk 7 is temporarily located in place in the round recess 61. The clip 3 has two ears 31 with laterally projected tenons 32 provided at a middle point of each side thereof. One of the tenons 32 can be directly inserted into one of the mortise spaces 74 on the rotational disk 7 while the other tenon 32 must be pushed over the other retaining block 73 to enter into the other mortise space 74, so as to assemble the clip 3 to the rotational disk 7. Following are the disadvantages of the conventional microphone clip connecting structure:

1. The locating projection 76 below the retaining block 73 is stopped by a bottom surface of the locating hole 63 or the round recess 61 from moving further down. Therefore, when the tenon 32 is pushed over the retaining block 73, the retaining block 73 can not be lowered any further for the tenon 32 to pass over it and into the mortise space 74. Thus, to assemble the clip 3 to the rotational disk 7, it is necessary to raise the rotational disk 7, so that the locating projection 76 is not stopped by the bottom surface of the locating hole 63 or the round recess 61, and an extra space is left between the disk 7 and the recess 61 for the retaining block 73 to lower while it is pushed by the tenon 32, as shown in FIGS. 7A and 7B. Due to the spring 8, it is difficult to consider at the same time about two forces applied in two different directions on the rotational disk 7 when mounting the clip 3. That is, the mounting of the clip 3 to the rotational disk 7 is difficult.

2. Due to the spring 8, the rotational disk 7 is allowed to axially move upward for a certain distance. However, this results in complicate components in the microphone clip connecting structure. Complicated die cutting thereof also increases the manufacturing cost of the structure.

SUMMARY OF THE INVENTION

It is therefore a primary object of the present invention to provide an improved microphone clip connecting structure which eliminates the drawbacks existed in the conventional structure by providing a sunken hole among the locating holes on the round recess of the microphone back cover. The sunken hole is deeper than the locating holes and therefore provides a larger space for the locating projection below the retaining block. That is, the spring is eliminated and it is not necessary to raise the rotational disk when mounting the clip to the rotational disk. Confusions from forces applied in two different directions on the rotational disk are avoided. The clip can be easily assembled to the rotational disk.

Another object of the present invention is to provide an improved microphone clip connecting structure in which a sunken hole is provided which allows the round recess of the back cover and the rotational disk to have simpler structure and therefore reduces cost required to cut dies for the components.

BRIEF DESCRIPTION OF THE DRAWINGS

The above and other objects of the present invention as well as the features and functions thereof can be best understood from the following detailed description of the preferred embodiment and the accompanying drawings, wherein.

DETAILED DESCRIPTION OF THE PREFERRED EMBODIMENT

Figure 1:
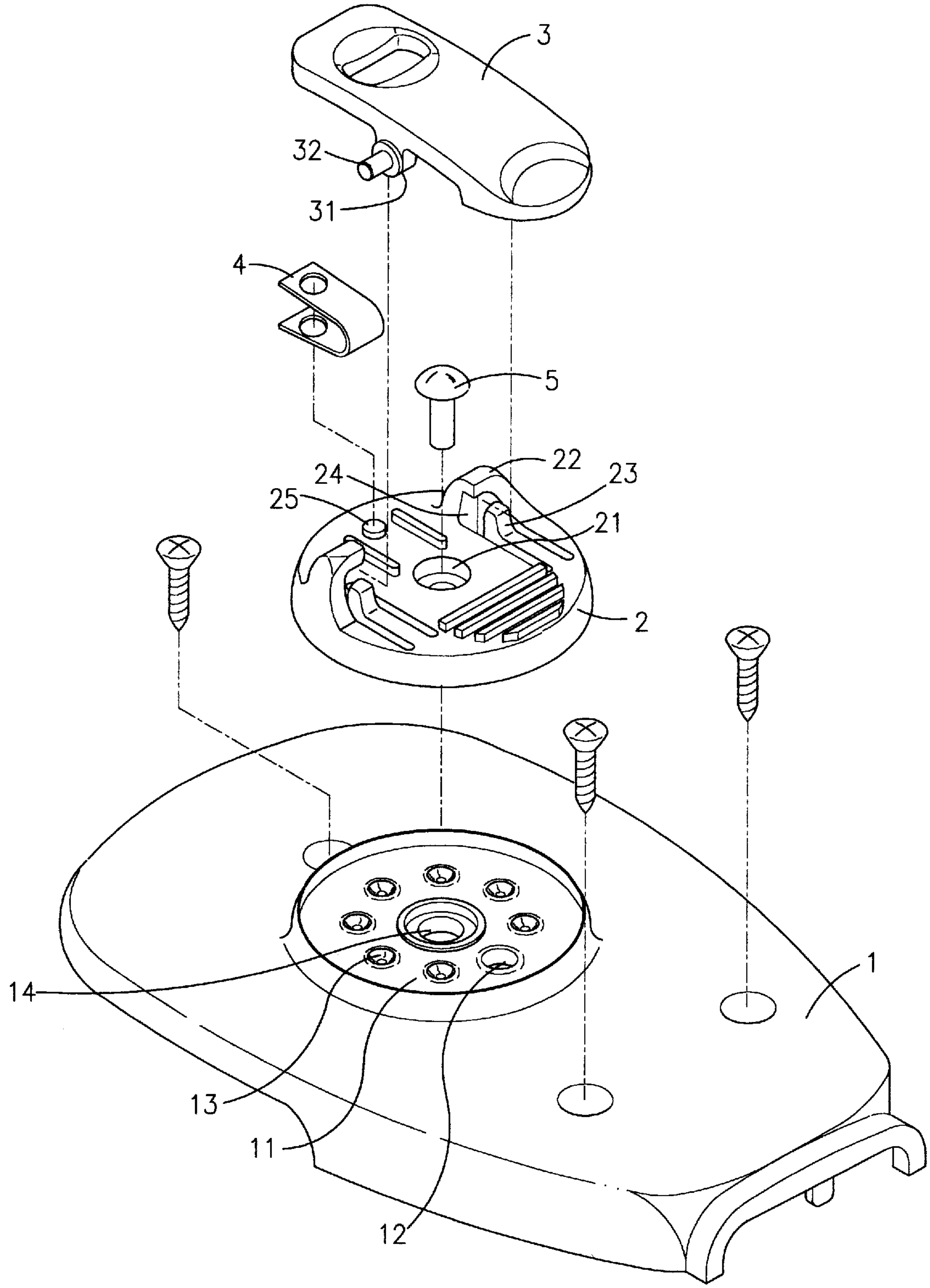
FIG. 1 is an exploded perspective showing the structure of the present invention.
Figure 2:
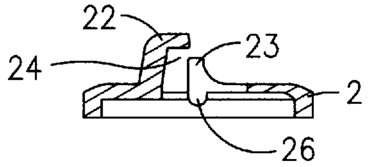
FIG. 2 is a sectional side view showing the structure of the rotational disc of the present invention.

Please refer to FIGS. 1 and 2. The present invention mainly relates to a microphone clip connecting structure. As shown in the drawings, there is a microphone back cover 1, on an outer surface of which there is provided with a round recess 11 for receiving a rotational disk 2 therein. A clip 3 is detachably connected to the rotational disk 2, so that a microphone assembled from these components can be clipped onto some desired position.

The round recess 11 of the back cover 1 has a central hole 14 and a plurality of locating holes 13 and a sunken hole 12 equally spaced around the central hole 14. The rotational disk 2 also has a central hole 21 axially in alignment with the central hole 14 on the back cover 1. A rivet 5 is extended through the central holes 21 and 14 to rotatably connect the rotational disc 2 to the back cover 1 in the round recess 11.

The rotational disk 2 is formed on a top surface with a pair of upward projected retaining hooks 22 and slightly flexible retaining blocks 23. The retaining hook 22 and the retaining block 23 are so designed that they together define a mortise space 24 between them. A locating projection 26 extends from a bottom side of the retaining block 23 and forms an integral part of the retaining block 23. Another projection 25 projects from the top surface of the rotational disk 2 and forms an integral part of the rotational disk 2 to hold a leaf spring 4 thereto.

When the rotational disk 2 is located in the round recess 11, the locating projections 26 downward extended from the two retaining blocks 23 engage into two of the locating holes 13 formed on the recess 11 around the central hole 14, allowing the rotational disk 2 to be turned about the rivet 4 relative to the back cover 1 and be temporarily fixed to a certain desired position determined by two of the locating holes 13.

Two ears 31 are integrally formed on an inner surface of the clip 3 at middle points of two lateral sides thereof. Two tenons 32 project sideward from the ears 31 in opposite directions and form an integral part of the ears 31. One of the tenons 32 can be directly inserted into one mortise space 24 to be retained between the retaining hook 22 and the retaining block 23 while the other tenon 32 must be pushed into another mortise space 24 at the other side of the rotational disk 2 from a top of another retaining block 23. To lower the other retaining block 23 so that the other tenon 32 can be easily pushed into the mortise space 24 and the clip 3 can be assembled to the rotational disk 2, simply turn the rotational disk 2 until one of the retaining blocks 23 and its downward extended locating projection 26 locate above the sunken hole 12. Since the sunken hole 12 has a depth larger than that of the locating holes 13, it allows the locating projection 26 to sink down into the sunken hole 12. That is, the retaining block 23 can be depressed further to allow the tenon 32 to easily pass over it and into the mortise space 24.

Figure 3:
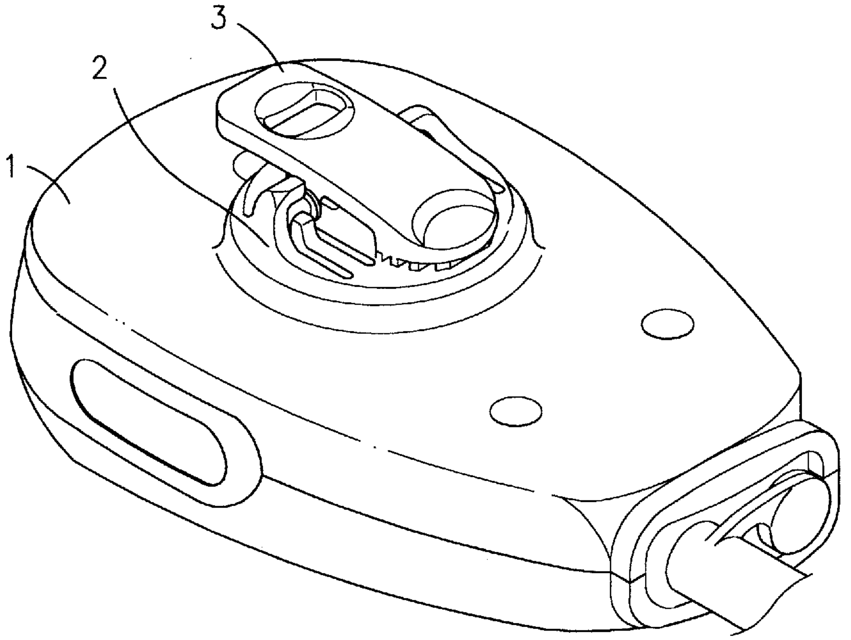
FIG. 3 is an assembled perspective of the present invention.
Figure 4A:
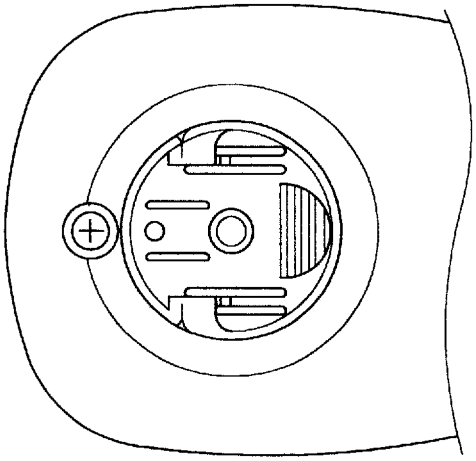
FIGS. 4A, 4B, 4C, and 4D illustrate the manner in which the clip is assembled to the rotational disk of the microphone.
Figure 4B:
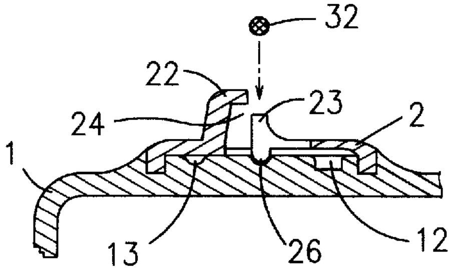
Figure 4C:
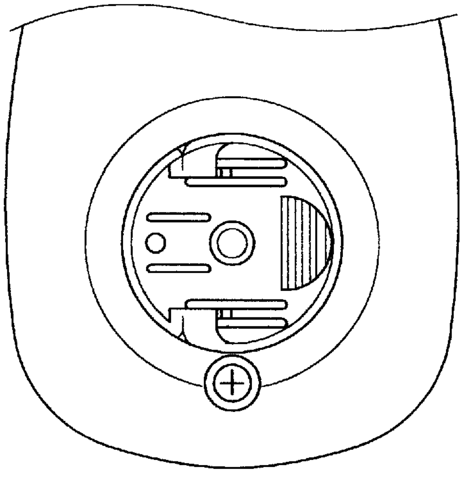
Figure 4D:
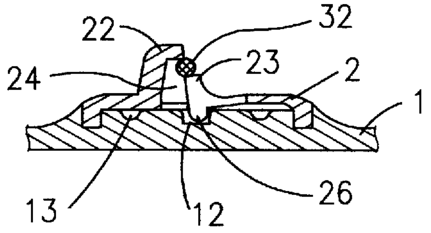
Figure 5:
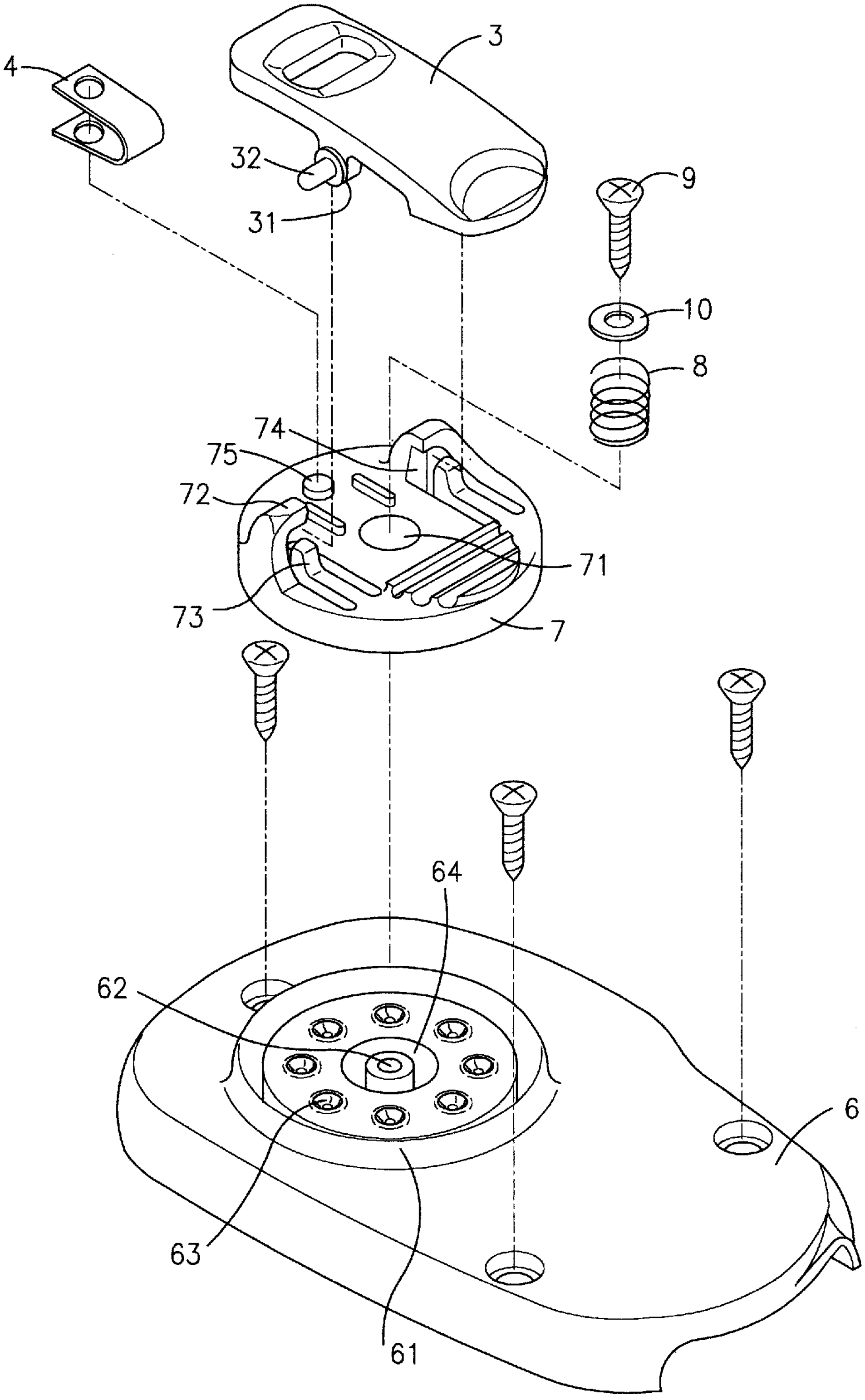
(PRIOR ART) FIG.5
FIG. 5 is an exploded perspective showing a conventional microphone clip connecting structure.
Figure 6:
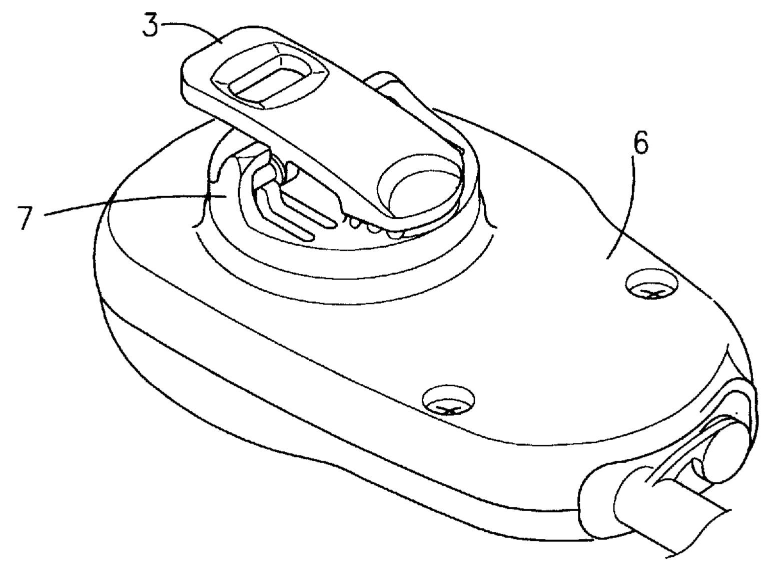
(PRIOR ART) FIG.6
FIG. 6 is a perspective showing a microphone with clip of FIG. 5 in an assembled state.
Figure 7A:
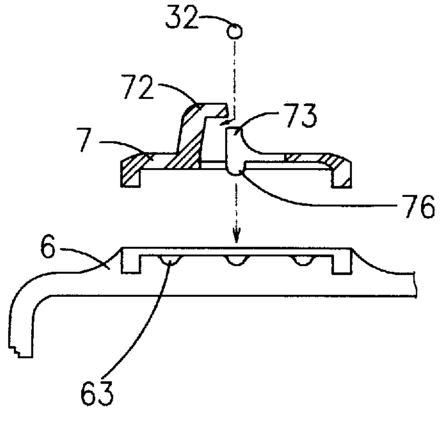
FIGS. 7A and 7B illustrate the conventional manner in which the clip is assembled to the rotational disk of the microphone.
Figure 7B:
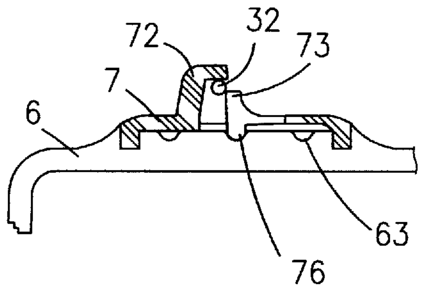

Please refer to FIGS. 4A to 4D. When the rotational disk 2 is in a position as shown in FIGS. 4A and 4B, the locating projections 26 are engaged into two of the locating holes 13 and be stopped by a bottom of the locating holes 13 from moving down further. At this point, a clearance left between a top of the retaining block 23 and the retaining hook 22 is smaller than a thickness of the tenon 32, preventing the tenon 32 from being pushed into the mortise space 24. When the rotational disk 2 is turned to be in a position as shown in FIGS. 4C and 4D, one of the locating projections 26 extends into the deeper sunken hole 12 which allows a larger or deeper space for the locating projection 26 to vertically move therein. Thereby, when the tenon 32 is pushed over the top of the retaining block 23, the retaining block 23 is allowed to lower due to the deeper sunken hole 12. The lowered retaining block 23 in turn permits a larger clearance between its top and the retaining hook 22 for the tenon 32 to pass through and into the mortise space 24. After the tenon 32 passes the retaining block 23, the latter automatically returns to its original higher position due to its flexibility and therefore, confines the tenon 32 in the mortise space 24. At this point, the clip 3 is assembled to the rotational disk 2 and accordingly the back cover 1 of the microphone, as shown in FIG. 3.

Following are the advantages of the present invention:

1. The provision of a sunken hole 12 eliminates the need of means to flexibly but limitedly raise the rotational disk 2 relative to the back cover 1. The clip 3 can be more easily assembled to the rotational disk and the back cover.

2. With the sunken hole 12, the round recess of the back cover and the rotational disk can be simplified in their structure. Dies for forming the back cover and the rotational disk can be more easily cut.

What is claimed is:

1. A microphone clip connecting structure, comprising a back cover of a microphone, a rotational disk, and a clip; said back cover being formed on an outer surface with a round recess for receiving said rotational disk therein, said round recess having a central hole and a plurality of locating holes and a sunken hole said plurality of locating holes and said sunken hole equally spaced around said central hole, said rotational disk also having a central hole axially in alignment with said central hole on said back cover, said rotational disc being rotatably connected to said back cover in said round recess by a rivet extended through said two central holes, said rotational disk being formed on a top surface with a pair of upward projected retaining hooks and slightly flexible retaining blocks, said retaining hook and said retaining block being so designed that they together define a mortise space between them: a locating projection extending from a bottom side of each said retaining block and forming an integral part of each said retaining block; said sunken hole having a depth larger than that of said locating holes to allow a larger or deeper space for said locating projection to vertically move therein; whereby, when said clip is assembled to said rotational disk by pushing a side tenon on said clip over a top of said retaining block, said retaining block being allowed to lower further due to said deeper sunken hole and therefore permitting said tenon of said clip to pass over said retaining block and into said mortise space between said retaining block and said retaining hook.

* * * * *